D. CUMMINGS.
Car Starter.

No. 23,757.

2 Sheets—Sheet 2.

Patented Apr. 26, 1859.

UNITED STATES PATENT OFFICE.

DAVID CUMMING, OF SORREL HORSE, PENNSYLVANIA.

DEVICE FOR STARTING RAILROAD-CARS.

Specification of Letters Patent No. 23,757, dated April 26, 1859.

*To all whom it may concern:*

Be it known that I, DAVID CUMMING, of Sorrel Horse, county of Montgomery, in the State of Pennsylvania, have invented certain new and useful Improvements in Devices for Starting Cars; and I do hereby declare that the following is a full and exact description thereof, reference being had to the accompanying drawings, and to the letters of reference marked thereon.

My invention relates more particularly to city cars and consists in an improved device for starting the car as will be hereinafter more fully described.

To enable those skilled in the art to make and use my invention I will proceed to describe its construction and operation referring by letters to the accompanying drawings forming part of this specification and in which—

Figure 1:
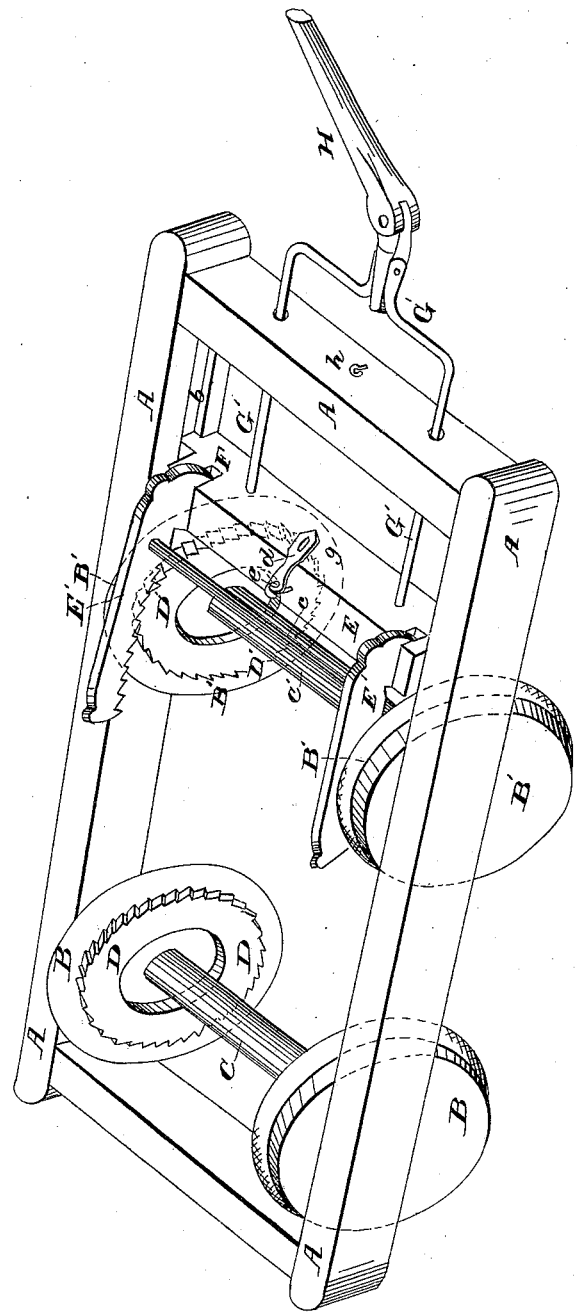
Figure 2:
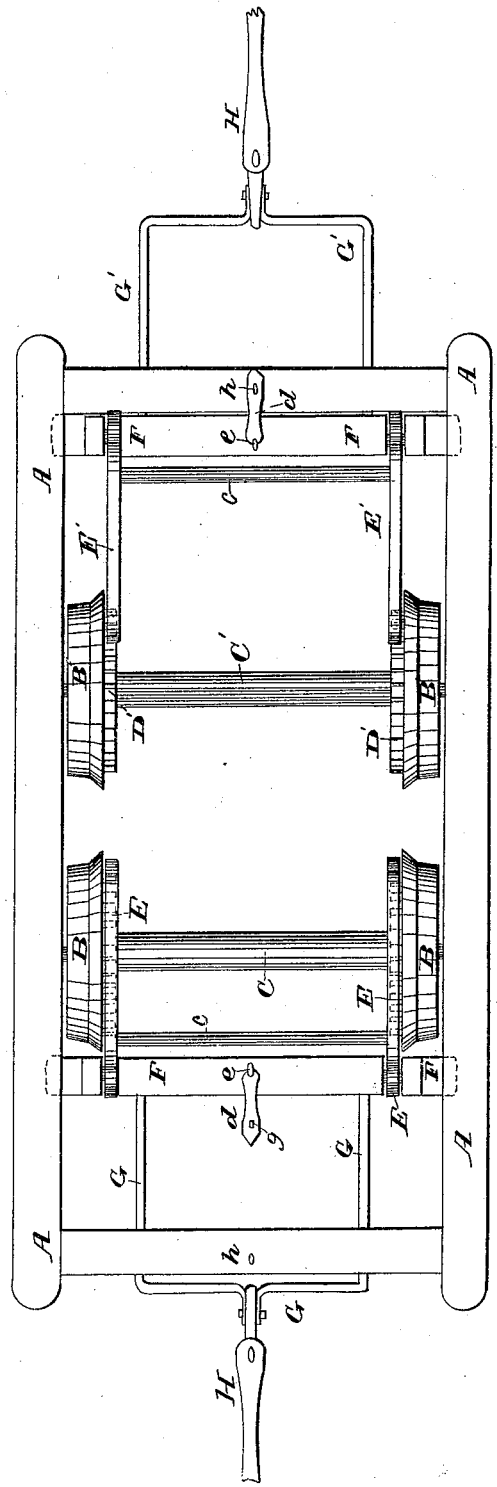
Figure 3:
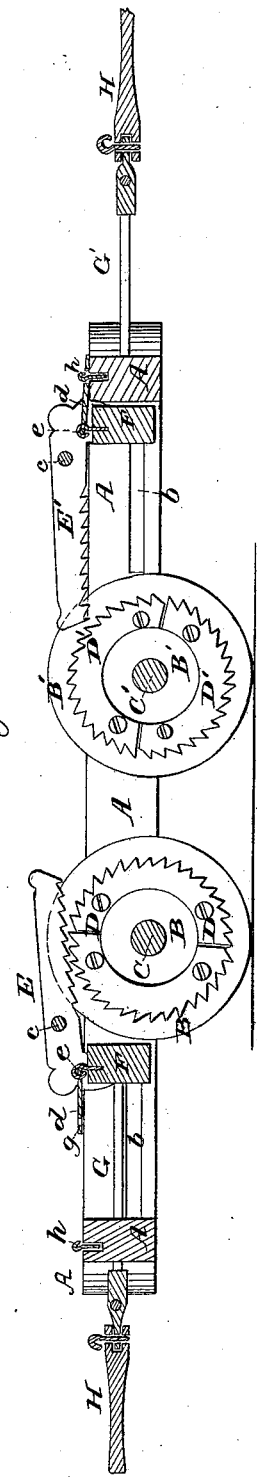

Figure 1 represents a perspective view of a car truck embracing my improvement, Fig. 2, represents a top view of the same and Fig. 3, represents a vertical longitudinal section through the center of the same.

Similar letters denoting the same parts in the different views.

A, represents the frame of the truck B, B′, the four wheels and C, C′ their axles.

D, D′ are the ratchet wheels which are made in sections and bolted into the sides of the truck wheels.

E, E′, are the ratchet bars which are arranged in two sets, one at each end of the truck and are pivoted at one end to the cross beam or carriage F, by means of a pin or stud, *a*, said carriage or traversing beam F, is constructed and arranged in the truck as that it may slide in grooves, *b*, toward and away from the wheels, (as will be presently explained). The ratchet bars, E, are braced together by a suitable rod, *c*, and are of such length that when the carriage or sliding beam F, shall have come into contact with the end of truck frame they shall have passed a little beyond the ratchet wheels so as not to be struck or rubbed against by said wheels during the continuance of their rotation and said ratchet bars it will be observed are rendered capable, by being pivoted to the beam F, to accommodate themselves to any irregularity in the periphery of the ratchet wheels, or in themselves.

*d*, is a coupling link which is swiveled at one end to the eye, *e*, in beam, F, and has in its other end a slot, *g*, through which passes, into the end of the truck a coupling pin, *h*.

G, G′ are four bars two at each end of the truck, which are fastened to the traversing beams F and passing through the end pieces of the frame A, form a frame, to which the tongue, H, may be coupled in any desirable manner.

In the drawing I have represented the mechanism at each end of the truck in a different position, in which positions they would appear when being in use: one set of ratchet bars with its frame &c., being locked to the trucks and out of gear while the other is at work.

The operation is as follows. Suppose the ratchet bars in position as seen at E′, and the team attached to the tongue H, then on starting the team the bars G′, and beam F′, will slide along in their bearings toward the end of the frame, A, carrying with them the ratchet bars, E′, and said bars gearing into the ratchet wheels D′, cause them to rotate and carry the car along, after the bars E′, have traveled out the length of their ratchets; they slide past, or out of gear with their ratchet wheels and the beam, F, comes against the inner side of the end piece of the frame, A, and the team then pulls directly upon the truck; the great advantage of starting the car or overcoming its inertia is obvious for since the power passes through a greater distance in the same time than the resistance, it follows that a leverage is obtained which is in proportion to the size of the ratchet wheels.

The advantages of my improvement are the ratchet bars operating always in a horizontal tangent to the top of the ratchet wheel the greatest possible amount of leverage is obtained and the ratchet wheels being made in sections can be readily applied to old wheels which may be fast in the axles while the construction is simple and durable.

I do not claim the use of ratchet wheels or pawls, but

Having described the construction of my improved device what I claim then as new and desire to secure by Letters Patent is, 1. In combination with the ratchet wheels D, the ratchet bars E arranged and operating as described for the purpose set forth.

2. So arranging the ratchet bars E with the sliding frame to which the power is applied at that said bars will be capable of slight play up and down when in clutch with their wheels and will run entirely out of contact with said wheels without the aid of other mechanism, as hereinbefore described for the purposes set forth.

In testimony whereof I have hereunto set my hand and seal this thirty-first day of December 1858.

DAVID CUMMING.

Witnesses:
JOHN SMITH,
ISSACHAR M. RHOADS.